US008786265B2

(12) United States Patent
Manlove et al.

(10) Patent No.: US 8,786,265 B2
(45) Date of Patent: Jul. 22, 2014

(54) ADJUSTABLE CURRENT LIMIT SWITCHING REGULATOR WITH CONSTANT LOOP GAIN

(75) Inventors: Gregory J. Manlove, Colorado Springs, CO (US); Andrew J. Gardner, Colorado Springs, CO (US); Yiding (Eric) Gu, Pleasant, CA (US)

(73) Assignee: Linear Technology Corporation, Milpitas, CA (US)

( * ) Notice: Subject to any disclaimer, the term of this patent is extended or adjusted under 35 U.S.C. 154(b) by 790 days.

(21) Appl. No.: 12/489,184

(22) Filed: Jun. 22, 2009

(65) Prior Publication Data

US 2010/0320974 A1 Dec. 23, 2010

(51) Int. Cl.
*G05F 1/00* (2006.01)

(52) U.S. Cl.
USPC .............................. 323/282; 323/284; 323/285

(58) Field of Classification Search
USPC .................................................. 323/282–288
See application file for complete search history.

(56) References Cited

U.S. PATENT DOCUMENTS

| 6,498,466 | B1 * | 12/2002 | Edwards ........................ 323/282 |
| 7,518,346 | B2 * | 4/2009 | Prexl et al. ..................... 323/222 |
| 7,518,349 | B2 * | 4/2009 | Xu ................................. 323/282 |
| 2003/0025484 | A1 * | 2/2003 | Edwards ........................ 323/288 |
| 2006/0043956 | A1 * | 3/2006 | Clavette ........................ 323/288 |
| 2007/0024253 | A1 * | 2/2007 | Schuellein et al. ........... 323/246 |
| 2007/0252567 | A1 * | 11/2007 | Dearn et al. ................... 323/282 |
| 2008/0265857 | A1 * | 10/2008 | Tabaian et al. ................ 323/288 |
| 2009/0261797 | A1 * | 10/2009 | Shibata ......................... 323/288 |
| 2010/0079127 | A1 * | 4/2010 | Grant ............................ 323/285 |
| 2010/0253309 | A1 * | 10/2010 | Xi et al. ........................ 323/288 |

* cited by examiner

*Primary Examiner* — Adolf Berhane
*Assistant Examiner* — Gary Nash
(74) *Attorney, Agent, or Firm* — McDermott Will & Emery LLP

(57) ABSTRACT

A switching regulator is configured to provide a regulated voltage to a load while maintaining a substantially maximum output current limit, the switching regulator having a loop gain. In accordance with one aspect the switching regulator comprises: a circuit for adjusting the maximum output current limit in response to a programmable signal independently of the loop gain. In accordance with another aspect, the switching regulator comprises: a resistance sensing element for providing the current output of the regulator, and having a resistance which varies with temperature; and a circuit for maintaining the output current limit at a level independent of the temperature of the sensing element. In addition, in accordance with one aspect, a method of providing a regulated voltage to a load is disclosed in which a substantially maximum output current limit of a switching regulator is maintained. In one aspect the method comprises: adjusting the maximum output current limit in response to a programmable signal independently of the loop gain. In accordance with a second aspect, the method comprises: maintaining the output current limit at a level independent of the temperature of the sensing element and a constant transient response to load perturbations as a function of temperature and current limit setting.

15 Claims, 4 Drawing Sheets

US 8,786,265 B2

ADJUSTABLE CURRENT LIMIT SWITCHING REGULATOR WITH CONSTANT LOOP GAIN

FIELD OF THE DISCLOSURE

Figure 1:
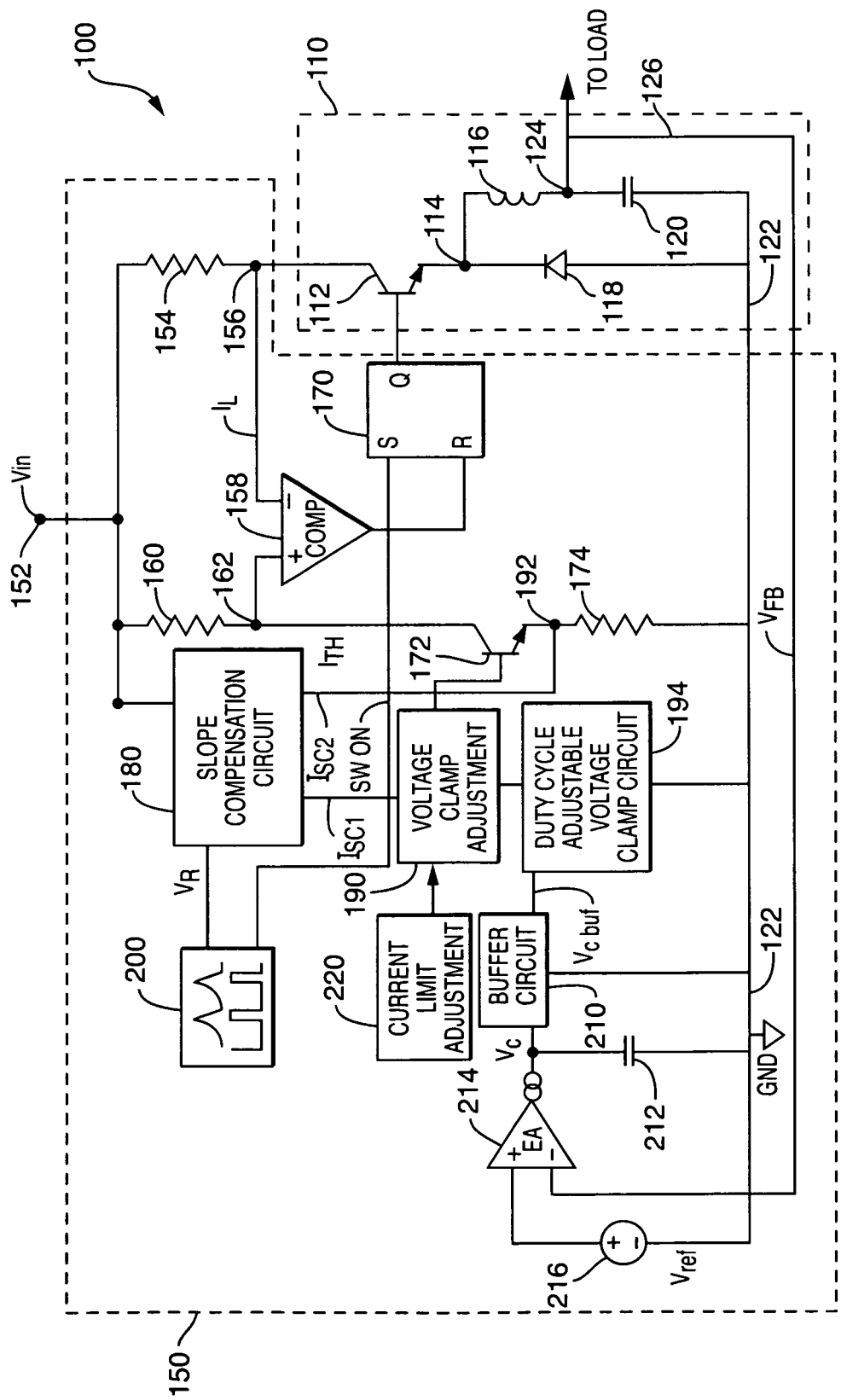

The present invention relates to switching voltage or power regulators, and more particularly to a switching voltage or power regulator configured to provide a programmable output current limit (also referred to as a programmable current trip threshold), the programmable output current limit further being independent of changes in temperature of the sensing resistance element (such as the DCR) of the inductor.

BACKGROUND OF THE DISCLOSURE

The purpose of a voltage regulator is to provide a predetermined and substantially constant output voltage to a load from a voltage source which may be poorly-specified or fluctuating. Two types of voltage regulators are commonly used to provide this function, a linear regulator and a switching regulator. In a typical linear regulator, the output voltage is regulated by controlling the flow of current through a pass device from the voltage source to the load.

In switching voltage regulators, however, the flow of current from the voltage source to the load is not steady, but is rather in the form of discrete current pulses. To create the discrete current pulses, switching regulators usually employ a switch (such as a power transistor) that is coupled either in series or parallel with the load. The current pulses are then converted into a steady load current with an inductive storage element.

Current-mode control has been used in switching power regulators for many years. One of the primary advantages of current mode control is that the circuit goes gracefully into output or peak current limit. This output current limit is also known as the current trip threshold because the regulator will no longer source any more current and the output voltage will droop until the system reaches equilibrium when the peak current limit is reached. In this way the load to which the regulator may be connected is protected from current overload.

In all current mode controllers, the current limit is established as a maximum voltage allowed across a current sensing element (typically the current sensing element is the DCR of the inductive storage device, but also can be a separate resistance element). The user can adjust the maximum current allowed by modifying the current sensing element. In some controllers, the current limit can also be adjusted by modifying the transconductance of the error amplifier used in providing an error signal as a function of the input and output signals. Both of these methods modify the loop gain of the network and require the compensation to be modified.

For most current mode applications this is not a problem. The current limit is one of the parameters established during the design phase and the compensation network is optimized for all the system requirements including the current limit. Finally, these parameters are fixed for the application and do not require adjustment.

There are new applications for DC/DC converters have the ability to modify the output parameters of the system during operation. To assure proper operation of the circuit, it is desirable to have the current limit threshold modified without affecting the loop gain. This assures optimal stability without the requirement to modify the compensation loop.

Further, the resistance of the sensing element can vary with temperature, which is particularly true where the resistance of the sensing element is the DCR of the inductive storage element.

SUMMARY DESCRIPTION OF THE DISCLOSURE

In accordance with one aspect of the disclosed subject matter, a switching regulator is configured to provide a regulated voltage to a load while maintaining a substantially maximum output current limit, the switching regulator having a loop gain. The switching regulator comprises: a circuit for adjusting the maximum output current limit in response to a programmable signal independently of the loop gain.

In accordance with another aspect of the disclosed subject matter, a switching regulator is configured to provide a regulated voltage to a load while maintaining a substantially maximum output current limit, the switching regulator having a loop gain. The switching regulator comprises: a resistance sensing element for providing the current output of the regulator, and having a resistance which varies with temperature; and a circuit for maintaining the output current limit at a level independent of the resistance of the sensing element.

In accordance with yet another aspect of the disclosed subject matter, a method of providing a regulated voltage to a load is described in which a substantially maximum output current limit of a switching regulator is maintained. The switching regulator is of the type having a loop gain. The method comprises: adjusting the maximum output current limit in response to a programmable signal independently of the loop gain.

And in accordance with still another aspect of the disclosed subject matter, a method of providing a regulated voltage to a load is described in which a substantially maximum output current limit of a switching regulator is maintained. The switching regulator is of the type having a loop gain, and a resistance sensing element for providing the current output of the regulator, the resistance sensing element having a resistance which varies with temperature. The method comprises: maintaining the output current limit at a level independent of the temperature of the sensing element.

GENERAL DESCRIPTION OF THE DRAWINGS

Figure 2:
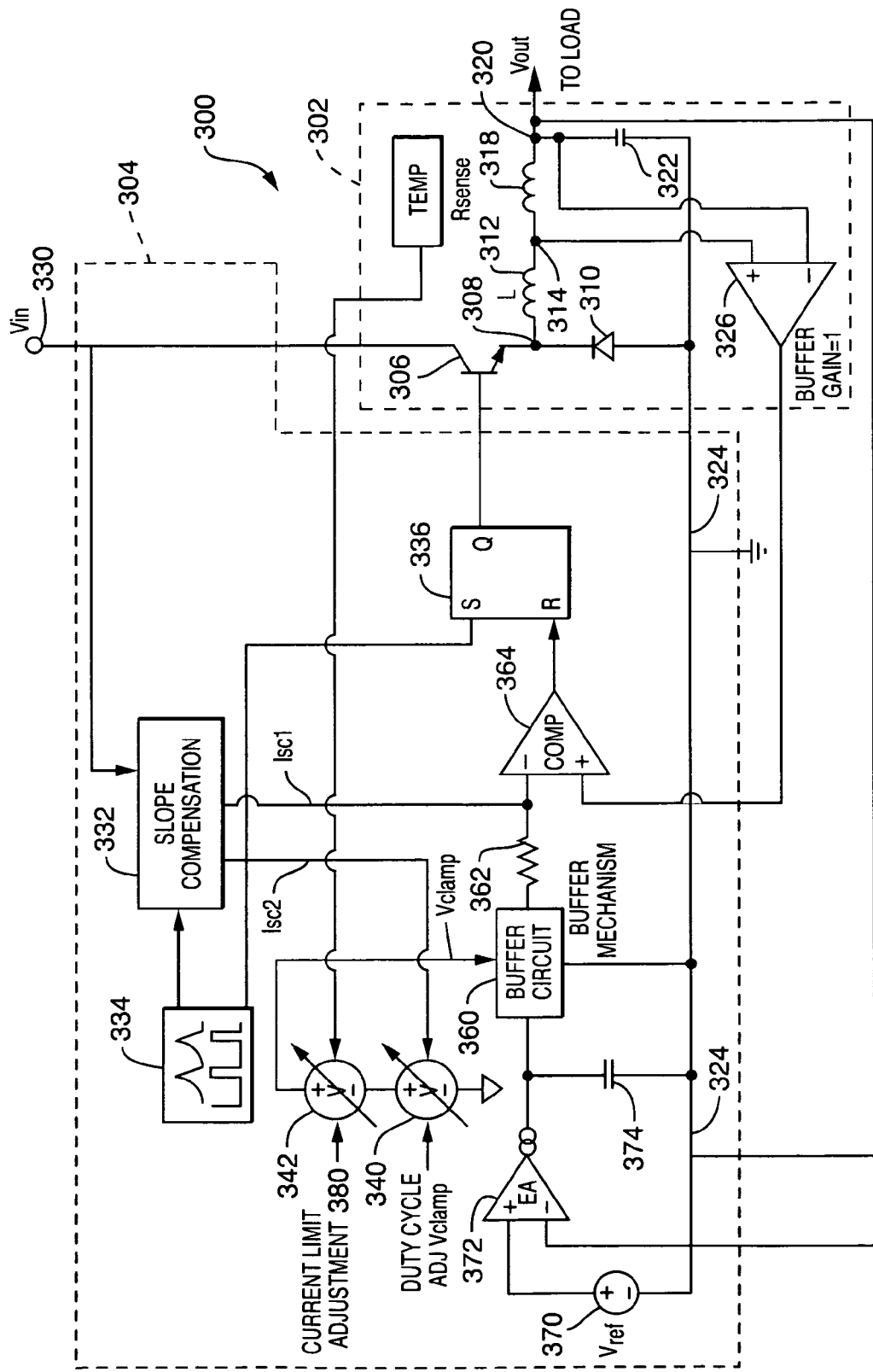
Figure 2A:
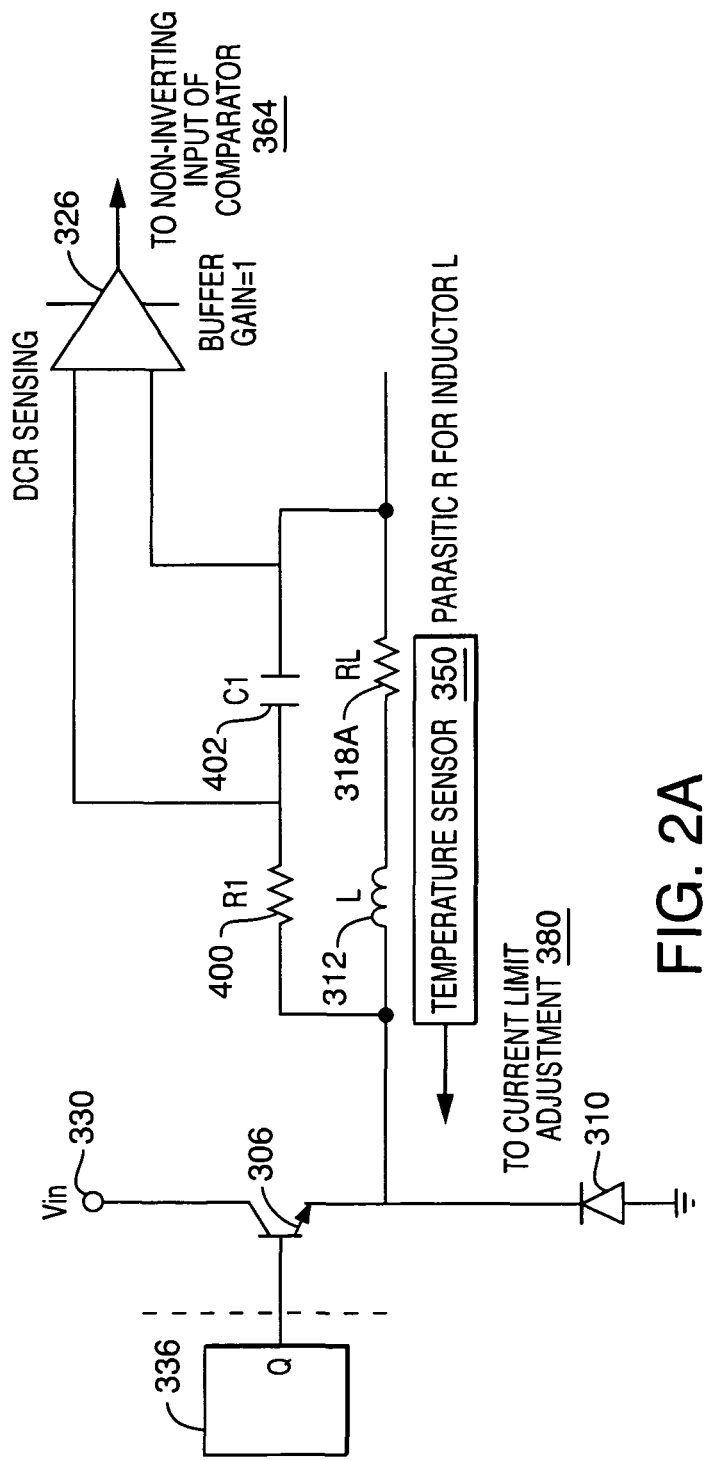
Figure 3:
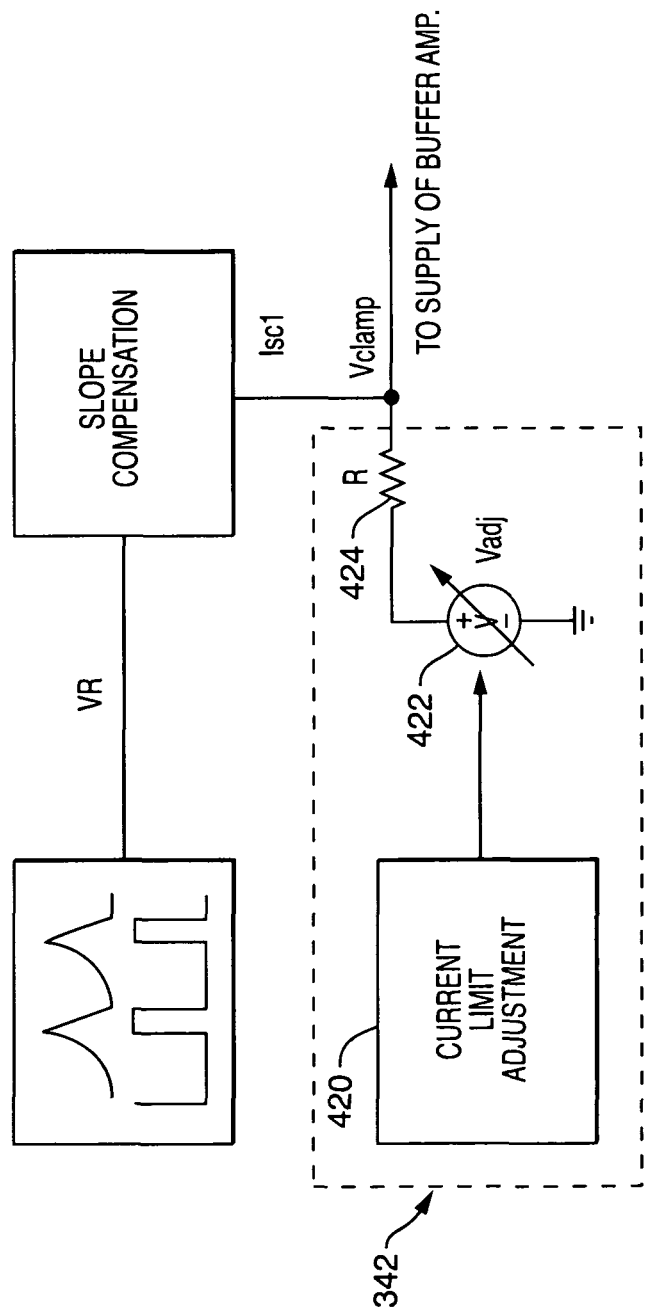

The advantages provided by the disclosure will be apparent upon consideration of the following detailed description, taken in conjunction with the accompanying drawings, in which like reference characters refer to like parts throughout, and in which:

FIG. 1 is a part block and part schematic diagram of one embodiment of a current mode voltage regulator incorporating aspects and features described herein temperature compensation is not required in this implementation;

FIG. 2 is a simplified, part block and part schematic diagram of one embodiment of a current mode voltage regulator, requiring temperature compensation, incorporating aspects and features described herein; and FIG. 2A is a detailed schematic diagram of one embodiment of a technique for sensing the DCR of the inductor incorporating aspects and features described herein; and FIG. 3 is a schematic drawing showing one embodiment of a voltage clamp adjustment device incorporating aspects and features described herein.

DETAILED DESCRIPTION OF THE DRAWINGS

Referring to FIG. 1, one embodiment of the switching regulator 100 generally comprises a output switching circuit 110 which is controlled by control circuit 150. Switching circuit 110 includes the switching element 112 shown in FIG. 1 in the form of a NPN transistor having its emitter connected to node 114. Although switching element 112 is depicted as a NPN bipolar junction transistor (BJT) in FIG. 1, any other suitable switching element may be used if desired, including PNP bipolar junction transistors, N-channel and P-channel MOSFETS, N-channel and P-channel JFETS, and N-channel and P-channel MESFETS. Node 114, is connected in turn to the inductive storage element 116 and the cathode of catch diode 118. The inductive storage element 116 is coupled through capacitor 120 to system ground indicated at 122. The anode of catch diode 118 is also connected to system ground 122. The output 124 of the circuit 110 is shown as a node between the inductive storage element 116 and the capacitor 120. Output 124 provides a regulated voltage to a load (not shown), with a defined current limit A feed back path 126 provides a feedback signal $V_{FB}$ from the output 124 to control circuit 150.

The control circuit 150 includes an input 152 for receiving the input voltage $V_{IN}$. The input 152 is connected through a sensing resistor 154 of the control circuit 150 to the collector of switching element 112. A node 156 is formed between sensing resistor 154 and the collector of transistor 112 of the output circuit 110. Node 156 is connected to the inverting input of comparator 158. Input 152 is also connected through threshold resistor 160 to the node 162. The current generated through resistor 160 is a threshold current $I_{TH}$. Node 162 in turn is connected to the non-inverting input of comparator 158. The output of current comparator 158 is connected to the reset input of latch 170, and compares the input current $I_{TH}$ applied to its non-inverting input and the input current $I_L$ applied to its inverting input. The output of latch 170 is applied to the base of switching element 112 of output circuit 110. Node 162 is also connected to the collector of transistor 172, which in turn has its emitter connected through resistor 174 to system ground 122. Finally, the input 152 provides the input to slope compensation circuit 180.

Compensation circuit 180 is provided so that the duty cycle of switch 112 of the output circuit 110 (i.e., the percentage of time that switch 112 is ON relative to the total period of the switching cycle) can be controlled so that the regulator can regulate the load voltage. In current-mode switching voltage regulators there is an inherent instability when the duty cycle exceeds 50% (i.e., when the switch is ON for more than 50% of a given switching period). Stability is often maintained in such current-mode switching regulators by adjusting the current-derived signal used to control the regulator with a slope compensation signal.

Various techniques for generating a slope compensation signal can be employed. One method of producing such a slope compensation signal is to use a portion of an oscillator signal as the compensation signal. The oscillator signal may be, for example, a ramp signal that is used to generate a clock signal that controls the switching of the regulator. The slope compensation signal can be applied by either adding the ramp signal to the current-derived signal, or by subtracting it from a control signal. An example of a typical prior art current-mode switching regulator utilizing slope compensation is shown and described in U.S. Pat. No. 6,611,131 issued to Edwards, assigned to the present assignee (hereinafter the "Edwards patent"), and incorporated herein by reference. In the embodiment shown in FIG. 1, compensation circuit 180 provides two output signals $I_{SC1}$ and $I_{SC2}$ (the purposes of which will be explained hereinafter), the former being applied to the input of voltage claim adjustment device 190, and the latter being applied to node 192 between the emitter of transistor 172 and resistor 174. The output of voltage clamp adjustment device 190 (described in greater detail hereinafter) is connected to the adjustable voltage clamp circuit 194 and to the base of transistor 172. The output of adjustable voltage clamp circuit 194 is connected to system ground 122.

Adjustable voltage clamp circuit 194 receives a buffered input voltage $V_{Cbuf}$ from buffer circuit 210, which is suitably connected to system ground and has its input connected through capacitor 212 to system ground 122. The input $V_C$ is received from the output of the error amplifier 214 which compares a reference voltage $V_{REF}$, provided at 216 and applied at its non-inverting input, and the feedback signal $V_{FB}$ from the output node 124. $V_C$ thus represents the error between a reference signal $V_{REF}$ and the output signal at output signal of the regulator so as to provide feedback compensation.

Finally, as described in more detail hereinafter, a current limit adjuster 220 provides one input to the voltage clamp adjustment device 190, which is the user input and is a function of the desired output current limit The voltage regulator of FIG. 1 operates as follows. Switch timing circuit 200 supplies a control signal SW ON for setting latch 170. While latch 170 is set, it provides a signal to output circuit 110 that causes switch 112 to turn ON and provide current from input voltage source $V_{IN}$ to output node 124. Latch 170 remains set until an output signal from current comparator 158 causes latch 170 to reset. When reset, latch 170 turns switch 112 OFF so that current is no longer drawn from source $V_{IN}$. Current comparator 158 determines when to reset latch 122 by comparing current signal ($I_L$) that is indicative of the current supplied to output circuit 110 with current threshold value ($I_{TH}$).

The primary purpose of output circuit 110 is to provide a substantially constant output voltage at output node 124 in response to current pulses as directed by control circuit 150. If the current of the load exceeds the current limit of the regulator, the regulator provides constant current to the load and gradually causes the output voltage to droop.

The operation of output circuit 110 can be divided into two periods. The first is when power switch 112 is ON, and the second is when power switch 112 is OFF. During the ON period, current passes from $V_{IN}$ through switch 112 and flows through inductor 116 to output node 114. During this period, catch diode 118 is reverse-biased. After power switch 112 turns OFF, however, inductor 116 still has current flowing through it. The former current path from $V_{IN}$ through switch 112 is now open-circuited, causing the voltage at node 114 to drop such that catch diode 118 becomes forward-biased and starts to conduct. This maintains a closed current loop through the load (not shown). When power switch 112 turns ON again, the voltage at node 114 rises such that catch diode 118 becomes reverse-biased and again turns OFF.

Still referring to FIG. 1, error amplifier 214 senses the output voltage at output node 124 of regulator 100 via feedback signal $V_{FB}$. Error amplifier 214, which is preferably a transconductance amplifier, compares $V_{FB}$ with reference voltage $V_{REF}$ provided by voltage source 216. Control signal, $V_C$, is generated in response to this comparison. The control signal $V_C$ is filtered by a capacitor 212 and applied to the buffer circuit 210. The output $V_{Cbuf}$ of buffer circuit 210 is applied to the adjustable voltage clamp circuit 194, which in turn applies its output to the base of transistor 172. The output of error amplifier 214 (control signal $V_C$) is applied to buffer circuit 210 which produces buffered control signal $V_{Cbuf}$ which is substantially proportional to $V_C$. Adding such a buffer circuit to the control loop is desirable because the buffered control signal is now substantially isolated from capacitor 212. In this configuration, $V_{Cbuf}$ is not burdened by the relatively large time constant of capacitor 212, and may quickly respond to a changing threshold level in adjustable voltage clamping circuit 194. The output $V_{Cbuf}$ of buffer circuit 160 is applied to the base of transistor 172 up to a limit determined by the adjustable voltage clamping circuit 194. The output of the circuit 194 controls transistor 172. When the value of $V_C$ is large enough to turn transistor 1720N, threshold current "$I_{TH}$" flows through resistor 160. Generally speaking, the value of $I_{TH}$ is dependent on $V_C$ up to the limit set by the adjustable voltage clamp circuit 194. As $V_C$ increases, so does $I_{TH}$ and vice versa.

The value of $I_{TH}$ establishes the threshold point at which current comparator 158 trips. Therefore, as $I_{TH}$ increases, the current threshold of switch 142 also increases to maintain a substantially constant output voltage. However, current-mode voltage regulators can become unstable when the duty cycle exceeds 50%. To prevent this instability, a duty cycle proportional slope compensation signal $I_{SC2}$ is subtracted from the feedback signal ($I_{TH}$) to increase the rate of current rise perceived by control circuit 150. This is accomplished by applying the ramp signal $V_R$ from switch timing circuit 200 to the slope compensation circuit 180, which in turn provides the slope compensation current $I_{SC2}$ to node 192 between the emitter of transistor 172 and resistor 174. As the ramp signal progresses toward its peak, the voltage at the emitter of transistor 172 rises, impeding the flow of current, which causes $I_{TH}$ to decrease. Current comparator 158 interprets this as an increase in the rate of current rise in inductive storage element 116. This causes the perceived rate of current rise in inductive storage element 116 to be greater than the rate of current fall, which allows regulator 100 to operate at duty cycles greater than 50% without becoming unstable.

To prevent damage to switch 172, the maximum operating current of regulator 100 is limited to a certain level by placing a voltage clamp on the $V_{Cbuf}$ signal with voltage clamp circuit 194. Thus, the $V_{Cbuf}$ voltage always remains at or below the preset maximum.

The regulator also allows its threshold to be adjusted with respect to the magnitude of slope compensation signal $I_{SC1}$ so that a substantially constant current limit may be maintained at greater duty cycles. This is accomplished by providing buffer circuit 210, and making the maximum clamp voltage provided by voltage clamp circuit 194 adjustable as a function of the output $I_{SC1}$ of slope compensation circuit 180. Buffer circuit 210 isolates a control signal from the capacitive loading provided by capacitor 212. The threshold level of the adjustable voltage clamp circuit 194 varies with respect to the amount of slope compensation (output $I_{SC1}$) provided to the voltage regulator. This allows the control voltage to increase as slope compensation increases so that the regulator can maintain a substantially constant maximum current limit at increased duty cycles.

Thus, during operation, in the illustrated embodiment, slope compensation circuit 180 may produce two proportional slope compensation signals when the duty cycle exceeds a preset value. As shown, one of the slope compensation signals ($I_{SC2}$) is applied to the emitter of transistor 172 to provide stability, while the other ($I_{SC1}$) is applied to adjustable voltage clamp circuit 194. Generally speaking, the turn-ON threshold of clamp circuit 194 varies with respect to $I_{SC1}$. As $I_{SC1}$ increases, so does the turn-ON threshold and vice-versa.

When the duty cycle of regulator 100 exceeds a preset value, slope compensation circuit 180 starts to generate the two slope compensation signals. As the duty cycle increases, the magnitude of the two slope compensation signals increases accordingly. The turn-ON threshold of adjustable voltage clamp circuit 194 will rise or fall in response to an increasing or decreasing value of $I_{SC1}$. When the duty cycle of regulator 100 falls below a preset value, however, the turn-ON threshold of adjustable voltage clamp circuit 194 reaches a predetermined minimum value and remains there to prevent damage to switching element 172. Thus, when operating at duty cycles below a preset value, clamp circuit 194 acts as a fixed threshold voltage clamp and slope compensation circuit 180 has no affect on the operation of regulator 100.

The main purpose of adjustable voltage clamp circuit 194 is to permit control signal $V_{Cbuf}$ to rise above the predetermined minimum turn-ON threshold when the duty cycle increases above a preset value. This allows control circuit 150 to "compensate" for the lower current thresholds that would normally result from the use of slope compensation signal $I_{SC2}$. For example, when the duty cycle of switch 172 increases above a preset value (e.g., about 50%), the rising magnitude of $I_{SC2}$ tends to increasingly impede the flow of current through transistor 172 by raising its emitter voltage. This causes the value of current $I_{TH}$ to become increasingly smaller, effectively reducing the switching threshold of current comparator 158 so that the amount of current that output circuit 110 can provide decreases. As $I_{SC2}$ rises, however, the turn-ON threshold of adjustable voltage clamp circuit 194 also rises correspondingly. This allows $V_C$ buf to rise, which may increase the voltage at the base of transistor 172, forcing it to turn ON harder. From an evaluative standpoint, this means that the permissible maximum value of $V_{C\,buf}$ increases with respect to $I_{SC2}$. The current decrease at the emitter of transistor 172 may be substantially "canceled-out" by an equivalent (or proportional) voltage increase at the base of transistor 172. Thus, the voltage reduction in $I_{TH}$ caused by slope compensation signal $I_{SC2}$ may be substantially offset by the corresponding rise of $V_{C\,buf}$. The net result permits regulator 100 to operate over a virtually full range of duty cycles (i.e., from 1% to about 95%) and still maintain a substantially constant maximum output current limit.

It will be understood from the foregoing that allowing the base voltage of transistor 172 to increase above the minimum turn-ON threshold established by adjustable voltage clamp circuit 194 will not harm switching element 172. This is because the effective maximum current level is still substantially maintained by voltage clamp circuit 194. For example, assume the transconductance from $V_{Cbuf}$ to switch 172 is 1 A/volt, and the turn-ON threshold of clamp circuit 194 is 1 volt. This means the maximum permissible switch current is set at a 1 A limit. If slope compensation raises the emitter voltage of transistor 172 by 0.3 volts, the increasing clamp threshold may also allow the base voltage to rise by 0.3 volts. Although the clamp turn-ON threshold is now 1.3 volts, the effective base voltage of transistor 172 with respect to its emitter is still 1 volt, which restricts the switch current to the desired 1 A limit.

The voltage clamp adjustment device 190 is provided to allow for adjustment of the current limit without modifying the loop gain. The voltage clamp output of 194 is summed with the clamp voltage of 190 to produce the new maximum voltage allowed on the base of transistor 172. This in turn limits the maximum $I_{TH}$ voltage movement. $I_{TH}$ sets the current comparator threshold and is now a voltage proportional to the slope compensation and the current limit adjustment. The addition of component 190 with digital inputs 220 from the user allows the user to modify the current comparator threshold without modifying the loop gain of the circuit. This occurs because the clamp circuits just modify the maximum voltage allowed on the gate of transistor 172 without impacting the circuit operation otherwise.

Referring to FIG. 2, a second embodiment of a DC/DC regulator 300 is shown in partial schematic, partial block form. In FIG. 2, the DCR of the inductive storage element is the sensing element for providing the output current of the regulator. As previously mentioned, the resistance of the DCR can vary significantly with temperature and therefore affect the output voltage. Accordingly, as shown the regulator 300 includes a device for compensating for any temperature changes so that the output voltage remains substantially independent of temperature. Further, in the exemplary embodiment shown, the regulator 300 also includes a device for adjusting of the current limit without modifying the loop gain, although it should be understood, that the two concepts are independent of one another, and regulators can be constructed either one or both features.

In the embodiment of FIG. 2, the regulator 300 includes the switching circuit 302 and the control circuit 304. Switching circuit 302 includes the switching element 306 shown as an NPN transistor, with its emitter connected to the node 308. Node 308 is connected to (1) the cathode of catch diode 310 and (2) the inductive storage element 312. Inductive storage element 312 in turn is connected to the node 314. The anode of catch diode 310 is connected to system ground 324. Element 318 is either a sense resistor or the DCR of inductor 312, shown connected between node 314 and output 320. If DCR sensing is used, node 314 is a virtual node and not available to the user. The actual circuit implementation of DCR sensing is shown in FIG. 2A and described in more detail later. Output 320 is connected through capacitor 322 to system ground 324. The voltage across resistance 318 is sensed by the unity gain amplifier 326, wherein the node 314 on one side of the resistance 318 is connected to the non-inverting input of the amplifier 326, while the output 320 on the other side of the resistance 318 is connected to the inverting input amplifier 326. The output of amplifier representing the voltage across resistance 318 is applied to the non-inverting input of comparator 364 of the control circuit 304. Finally, the output 320 of the regulator is applied to the inverting input of the transconductance error amplifier 372.

The control circuit 304 includes the input 330 which is connected to the collector of switching element 306, and to the input of slope compensation circuit 332. Similar to the FIG. 1 embodiment, the slope compensation circuit receives at a switching timing signal from the switching timing circuit 334, the latter providing a signal to the set S input of the latch 336, and provides two output current signals $I_{SC1}$ and $I_{SC2}$ which serve the same functions as described in connection with the FIG. 1 embodiment. In this case, the current $I_{SC1}$ is applied to the non-inverting input of the comparator 364, while the current $I_{SC2}$ is applied to the adjustable voltage clamp circuit 340. The embodiment of FIG. 2 also includes the voltage clamp adjustment device 342. Circuit 340 and device 342 provide two voltage sources connected in series relative to system ground. The voltage provided by circuit 340 is provided as a function of the current $I_{SC2}$, and thus is proportional to the slope compensation of the controller. The voltage provided by device 342 is a function of the resistance of the DCR resistance 318 (which as previous stated can vary with temperature) as sensed by a sensor 350. (for sensing temperature). The voltage provided by device 342 is also user defined with a current limit input similar to circuit block 220 in FIG. 1. The user can modify the voltage clamp and thus change the current limit of the system without modifying the loop gain of the circuit. The circuit 340 and the device 342 thus provide a total voltage, Vclamp, which is applied to the buffer circuit 360 and determines the maximum voltage that can be provided across resistor 362 and applied to the inverting input of the comparator 364. An additional voltage is provided by Isc1, at the non-inverting input of comparator 336. Thus, the inverting input of the comparator Ith is a function of Vclamp and Isc1. Because ITH is allowed to increase with $I_{SC1}$ and the voltage clamp of buffer circuit 360 also increases with $I_{SC2}$ (proportional to $I_{SC1}$) the slope compensation circuit will not impact the current limit of the circuit. This is analogous to nodes 172 and 174 in FIG. 1 both increasing proportionally with slope compensation.

A voltage reference source 370 is applied to the input of the transconductance amplifier 372, which in turn has its output connected through the capacitor 374 to system ground 324 and to the input of buffer circuit 360. The output of comparator 364 is applied to the reset R input of the latch 336, while the Q output of latch 336 is connected to the base of switching element 306. Finally, the device 342 is adapted to receive a digital input 380 for setting the current limit without affecting the loop gain of the regulator 300.

Referring to FIG. 2A, Rsense resistance 318 can actually be eliminated improving the efficiency of the regulator circuit. As more clearly shown the inductor 312 has a parasitic resistance ($R_L$) indicated at 318A. Since the resistor ($R_L$) 318A is a parasitic resistance, one can not actually sense the voltage across it. Instead, a resistor ($R_1$) 400 and capacitor ($C_1$) 402 are connected in parallel with inductor 312 and, by virtue of the inherent parasitic nature of resistor 318, with resistor 318. By making the value of $L/R_L$ equal to $R_1 C_1$, the voltage across $C_1$ is the same as the voltage across $R_L$. Thus, by connecting opposite sides of capacitor 402 to the input of buffer amplifier 326, the output signal of the buffer amplifier represents the value of the voltage across the parasitic resistance 318. This voltage is equal to the current through the inductor times the parasitic resistance and is used to control the current limit of the regulator.

Sensing resistor 154 of FIG. 1, by its nature consumes power across the collector side of NPN transistor 112, which represents a loss of energy and a reduction in efficiency. By eliminating resistor 154 and using resistor 400 and capacitor 402, the regulator become more efficient because resistor 400 and capacitor 402 are not added in series, and thus will not materially affect the efficiency of the circuit under a high current load. The current across R1 will slightly reduce the efficiency at light loads While Rsense is not in the collector path of the switching element (transistor 306, it never-the-less consumes power by being in series with the inductor 312. However, the resistance is a parasitic and is inherent in the inductor and can not be eliminated. The DRC resistance 318A of inductor 312 has a very large temperature coefficient (eg., 3900 ppm/C.°) that can affect the performance of the circuit.

Thus, the addition of component 342 with digital inputs 380 from the user allows the user to modify the current comparator threshold without modifying the loop gain of the circuit. This occurs because the clamp circuits just modify the maximum voltage allowed at the non-inverting input of comparator 364 without impacting the circuit operation otherwise.

Without further compensation, the current limit of the FIG. 2 embodiment as described so far is set correctly for one operating temperature. If the sensing resistance of the sensing element indicated at 318 or 318A has a high positive temperature coefficient, such as when the sensing element is the DCR of the inductive storage device 312 (as described above), changes in the sensing resistance will result in changes in the current limit. One technique of compensating for changes in the resistance of sensing resistor 318 is to provide the sensing capacitor 322 with a complementary negative temperature coefficient to compensate for and offset changes in the temperature dependent resistance of the sensing resistance element 318. Unfortunately, while the change in impedance provided by the sensing capacitor 318 will offset the changes in impedance of the sensing element to maintain the current limit constant, such changes will be at the expense of modifying the loop gain with temperature which is undesirable.

Accordingly, additional compensation is provided for adjusting the current limit without modifying the loop gain. In the embodiment shown in FIG. 2, the current trip threshold or output current limit of the circuit is directly proportional to the voltage appearing at the negative input of comparator 364. An adjustable voltage clamp device 342 is provided to modify the clamping voltage provided by clamp circuit 340 as a function of temperature as sensed by sensor 350 of FIG. 2. Sensor 350 is placed as close as possible to the inductive storage device 312 as best shown in FIG. 2A. The result is that the voltage clamp applied to the inverting input of the comparator 364 is now an adjustable parameter compensating for the variable voltage across the sense resistor applied to the positive terminal of comparator 364. This maintains a constant loop gain independent of temperature changes.

0V clamp as a function of temperature, an adjustment signal can be provided to the device 342 as a function of the temperature of the sensing resistance (using any suitable means such as a sensor 350). Sensing the temperature of the sensing element is equivalent to sensing the change in resistance of the sensing element since it varies proportionately with temperature. In addition, the device 342 may also receive a programmable input signal from the input 38 (e.g., a pin of an integrated circuit) in order to modify the clamping voltage Vc. This allows the feed back circuit to be a part of an integrated circuit, and yet allows an external (preferably digital) programmable signal 380 to be applied in order to set the current limit to a desirable and programmable level.

Thus, the FIG. 2 embodiment allows for the adjustment of the current limit without modifying the loop gain.

Referring again to FIGS. 2 and 2A, in applications where DCR sensing of the inductor current is used, the resistance of the sensing element has a very large positive temperature coefficient, e.g., approximately 3900 ppm/° C. As the temperature increases, the resistance of the sensing element increases correspondingly. To maintain a constant loop gain and keep the dynamic response of the system constant with temperature, the sensed current signal input must be allowed to vary with temperature. This has the negative effect of reducing the current limit as temperature increases. To remove this error, the required Vc voltage must be increased as a direct percentage of the increase in sense resistance.

FIG. 3 is a simplified illustration of an embodiment of the voltage clamp adjustment device 342. Device 342 includes current limit adjustment 420 which can be a digital input set by the user, adjustable voltage source 422 which provides an output voltage as a function of the output of current limit adjustment 420, and an output resistor 424 for providing the output voltage as a function of the voltage set by source 422. The digital input of adjustment thus sets the voltage Vadj of voltage source 422. This voltage is applied across resistor 424, which together with the output of the adjustable voltage clamp circuit establishes Vclamp. Ith cannot not exceed Vclamp.

A variable voltage with constant resistance as shown in FIG. 3 can be implemented in a variety of ways to those skilled in the art. One embodiment of this block diagram is an R2R digital to analog converter. The R2R digital to analog converter provides a voltage at the output proportional to the digital word applied and the resistance of the circuit is essentially constant regardless of the programmed voltage. The resolution of the converter is driven by the accuracy requirements of the application. The desired range of the voltage clamp must be increased to account for the temperature dependency of the sensed resistor beyond the desired user programmable range. If the application can work from −40 to 125 degrees C. the 3900 ppm/° C. temperature coefficient will require the voltage clamp to increase 39% above the maximum room temperature limit and reduce 25% below the minimum room temperature setting. Typically this will require the resolution of the digital to analog converter to increase at least 1 bit to account for the extra clamp voltage range.

A circuit schematic and block diagram have been shown that allow modification of the current limit circuit in a current mode controller without modifying the loop gain. This allows adjustment of the current limit of the controller without requiring the compensation network to be modified. This is particular advantageous in allowing the circuit to be manufactured as an IC, and also allow the designer to program the circuit with an externally applied signals to modify the current limit depending on the load requirements. The circuit also has the added benefit of adjusting for temperature variations in the sense resistor without corresponding errors in the over current limit or changes in the dynamic response of the system.

While the principles of the present invention have been illustrated using buck, step-down switching regulators, persons skilled in the art will appreciate that the principles may be equally applied to other switching regulator topologies, including for example, boost, step-up switching regulators and buck-boost switching regulators. Thus, persons skilled in the art will appreciate that the principles of the present invention can be practiced by other than the described embodiments, which are presented for purposes of illustration and not of limitation, and the present invention is limited only by the claims which follow.

What is claimed is:

1. An integrated circuit comprising:
a switching regulator configured to provide a regulated voltage to a load while maintaining a substantially maximum output current limit, the switching regulator including:
an output circuit (a) comprising a switch circuit that is configured to be coupled to a power source and an output, (b) a duty cycle adjustable voltage clamp circuit; and (c) a voltage clamp adjustment circuit; the output circuit being configured to provide a feedback signal through a feedback path that is function of the regulated voltage;
wherein the switching regulator defines a loop gain; and
an input to the switching regulator integrated circuit for applying an adjustment signal from a source external to the voltage clamp adjustment circuit in the presence of no slope compensation so as to modify the nominal maximum output current limit to a desired value while maintaining the regulated voltage without significantly affecting the loop gain.

2. An integrated circuit of claim 1, wherein the adjustment signal is programmable as a function of the load.

3. An integrated circuit of claim 1, further including a control circuit coupled to the output circuit configured to receive the feedback signal, the control circuit providing a first control signal to the output circuit in response to the feedback signal.

4. An integrated circuit of claim 3, wherein the control circuit comprises:
(a) a switch timing circuit that generates a ramp signal;
(b) a slope compensation circuit coupled to the switch timing circuit that generates first and second slope compensation signals in response to the ramp signal;
(c) a voltage clamp circuit that receives the first slope compensation, the voltage clamp circuit having a clamp threshold that varies with respect to the first slope compensation signal.

5. An integrated circuit of claim 4, wherein the input to the integrated circuit for applying an adjustment signal from a source external to the integrated circuit is coupled to the control circuit so that the first slope compensation signal is modified as a function of the adjustment signal.

6. An integrated circuit of claim 5, wherein the slope compensation circuit is configured so that the first slope compensation signal varies as a function of the maximum allowable current threshold of the switching regulator so that the current supplying capability of the switching regulator remains substantially constant at a value which is in part a function of the adjustment signal.

7. An integrated circuit of claim 4, wherein the second slope compensation signal is substantially proportional to the first slope compensation signal.

8. An integrated circuit of claim 7, wherein the second slope compensation signal is coupled to establish a threshold point at which the switch circuit switches so that the regulator remains stable over a substantially full range of duty cycles.

9. An integrated circuit of claim 4, wherein the switching timing circuit generates the ramp signal, the control circuit further including a signal adjuster configured to adjust the second slope compensation signal so that the ramp signal is generated substantially independently of temperature.

10. An integrated circuit of claim 9, wherein the switch timing circuit includes an inductor having a DC resistance (DCR) which varies as a function of temperature, wherein the signal adjuster is configured to adjust the second slope compensation signal so that the change in DCR with temperature does not substantially change the current limit as a function of temperature.

11. A switching regulator configured to provide a regulated voltage to a load while maintaining a substantially maximum output current limit, the switching regulator comprising:
an output circuit (a) comprising a switch circuit that is configured to be coupled to a power source and an output, and (b) a duty cycle adjustable voltage clamp circuit; the output circuit being configured to provide a feedback signal through a feedback path that is function of the regulated voltage; and
a control circuit including a switch timing circuit configured to generate a ramp signal, and a signal adjuster configured to adjust the feedback signal in response to a signal generated as a function of sensed temperature so that the ramp signal is generated substantially independently of temperature.

12. The switching regulator of claim 11, wherein the switch timing circuit includes an inductor having a DC resistance (DCR) which varies as a function of temperature, wherein the signal adjuster is configured to adjust the feedback signal so that the change in DCR with temperature does not substantially change the current limit as a function of temperature.

13. A switching regulator configured to provide a regulated voltage to a load while maintaining a substantially maximum output current limit, the switching regulator having a loop gain, the switching regulator comprising:
a circuit including (a) a duty cycle adjustable voltage clamp circuit; and (b) a voltage clamp adjustment circuit; for adjusting the maximum output current limit in response to a programmable signal from a source external to the voltage clamp adjustment circuit in the presence of no slope compensation so as to modify the nominal maximum output current limit to a desired value while maintaining the regulated voltage without significantly affecting the loop gain.

14. A method of providing a regulated voltage to a load while maintaining a substantially maximum output current limit of a switching regulator of the type having a loop gain and comprising (a) a duty cycle adjustable voltage clamp circuit; and (b) a voltage clamp adjustment circuit, the method comprising:
adjusting the maximum output current limit in response to a programmable signal from a source external to and applied to the voltage clamp adjustment circuit, where adjustment of the output current limit is performed in the presence of no slope compensation so as to modify the nominal maximum output current limit to a desired value while maintaining the regulated voltage without significantly affecting the loop gain.

15. In an output circuit comprising (a) a switch circuit that is configured to be coupled to a power source and an output, (b) a duty cycle adjustable voltage clamp circuit coupled to the switch circuit for regulating the voltage output of the output circuit; and (c) a feedback control circuit including switch timing circuit configured to generate a ramp signal for applying to the duty cycle adjustable voltage clamp circuit and a feedback signal as a function of temperature; a method of providing a regulated voltage to a load while maintaining a substantially maximum output current limit, the method comprising:
generating a feedback signal through the feedback path of the switch circuit that is a function of the regulated voltage; and
generating a ramp signal, and adjusting the feedback signal so that the ramp signal is generated substantially independent of temperature.

* * * * *